United States Patent
Stoller et al.

(10) Patent No.: US 7,633,058 B2
(45) Date of Patent: Dec. 15, 2009

(54) HERMETICALLY SEALED PACKAGING AND NEUTRON SHIELDING FOR SCINTILLATION-TYPE RADIATION DETECTORS

(75) Inventors: Christian Stoller, Princeton Junction, NJ (US); Bradley Albert Roscoe, Ridgefield, CT (US); Olivier G. Philip, Ewing, NJ (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 11/949,942

(22) Filed: Dec. 4, 2007

(65) Prior Publication Data

US 2009/0140134 A1 Jun. 4, 2009

(51) Int. Cl.
G01V 5/04 (2006.01)
G01T 1/00 (2006.01)
G01T 3/00 (2006.01)
(52) U.S. Cl. ............... 250/265; 250/390.11; 250/390.01
(58) Field of Classification Search .................. 250/265
See application file for complete search history.

(56) References Cited

U.S. PATENT DOCUMENTS

| | | | |
|---|---|---|---|
| 2,830,184 A * | 4/1958 | Scherbatskoy | 250/264 |
| 3,127,512 A * | 3/1964 | Monaghan | 376/153 |
| 3,148,280 A * | 9/1964 | Kleber et al. | 250/518.1 |
| 3,564,251 A * | 2/1971 | Youmans | 250/269.1 |
| 4,158,773 A | 6/1979 | Novak | |
| 4,937,446 A | 6/1990 | McKeon et al. | |
| 5,548,116 A | 8/1996 | Pandelisev | |
| 6,011,266 A | 1/2000 | Bell | |
| 6,373,066 B1 * | 4/2002 | Penn | 250/390.11 |
| 6,781,115 B2 | 8/2004 | Stoller et al. | |
| 7,084,403 B2 | 8/2006 | Srivastava et al. | |
| 2002/0121604 A1 * | 9/2002 | Katagiri | 250/368 |
| 2002/0170348 A1 * | 11/2002 | Roscoe et al. | 73/152.02 |
| 2003/0178574 A1 * | 9/2003 | Wallace et al. | 250/390.11 |
| 2004/0061058 A1 * | 4/2004 | Williams | 250/361 R |
| 2005/0017185 A1 * | 1/2005 | King | 250/370.05 |
| 2007/0272874 A1 * | 11/2007 | Grodzins | 250/390.11 |
| 2009/0200480 A1 * | 8/2009 | Clothier et al. | 250/390.01 |

* cited by examiner

Primary Examiner—David P Porta
Assistant Examiner—Yara B Green
(74) Attorney, Agent, or Firm—Darla P. Fonseca; Jaime Castano

(57) ABSTRACT

A well logging instrument includes a source of high energy neutrons arranged to bombard a formation surrounding the instrument. A scintillator sensitive to gamma radiation resulting from interaction of the high energy neutrons with the formation is disposed in the instrument. A neutron shielding material surrounds the scintillator. A neutron moderator surrounds the neutron shielding material. An amplifier is optically coupled to the scintillator.

19 Claims, 4 Drawing Sheets

HERMETICALLY SEALED PACKAGING AND NEUTRON SHIELDING FOR SCINTILLATION-TYPE RADIATION DETECTORS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of scintillation-type radiation detectors for use in well logging instruments. More specifically, the invention relates to various forms of radiation shielding for such detectors to reduce detection of radiation other than the specific radiation events intended to be detected.

2. Background Art

Various well logging instruments are known in the art that measure radiation phenomena originating from subsurface formations surrounding a wellbore. Such instruments may be inserted into the wellbore at the end of an armored electrical cable, on a pipe string or coiled tubing or other conveyance. Some forms of such instrument include a source of high energy neutrons. The source is configured to emit the neutrons into the formations surrounding the wellbore. The source may be a "chemical" source that includes a radioisotope, for example, americium-241 powder mixed with beryllium powder. Other sources are electrically controlled accelerators, such as deuterium-tritium or deuterium-deuterium accelerators that emit a continuous stream of neutrons or controlled duration "bursts" of neutrons into the formations.

Such well logging instruments include one or more radiation detectors, typically scintillation counters. A scintillation counter includes a crystal made from a material that is sensitive to radiation entering therein. Such material emits a small flash of visible, infrared or ultraviolet light upon interaction with radiation. Typically the amplitude of the flash is related to the energy of the deposited radiation. A converter and amplifier, such as a photomultiplier, is optically coupled to the crystal, and is arranged to generate a detectable electrical pulse corresponding to each radiation detection event. U.S. Pat. No. 7,084,403 issued to Srivastava et al. describes a variety of different materials used for scintillation detector crystals, including their respective advantages and disadvantages.

One particularly useful type of well logging instrument is known under the trademark RST which is a trademark of the assignee of the present invention. Such instruments and its more recent improved implementations thereof, include an accelerator type source of neutrons that emits controlled duration bursts of high energy neutrons into the formations surrounding a wellbore. One or more scintillation type radiation detectors are arranged in the instrument to detect gamma rays resulting from interactions of the neutrons with the surrounding formations. In order for such instruments to provide measurements that are closely representative of the properties of the surrounding formations, it is desirable to shield the one or more radiation detectors from both direct emission of neutrons from the source and from neutrons that interact with the formations and the materials in the wellbore. Such neutrons may cause events in the radiation detectors that are not related to the properties of the formations desired to be evaluated.

Certain materials for scintillation detectors, for example, those described in the above referenced '403 patent, have physical characteristics such as being hygroscopic and being susceptible to damage by mechanical shock and vibration that make it desirable to mount the scintillation crystal to reduce the effects thereon of moisture, shock and vibration. It is also desirable to provide such mounting with suitable radiation shielding properties so that the radiation detector is primarily sensitive to radiation events of interest, while being relatively insensitive to other radiation events.

SUMMARY OF THE INVENTION

A well logging instrument according to one aspect of the invention includes a source of high energy neutrons arranged to bombard a formation surrounding the instrument. A scintillator sensitive to gamma radiation resulting from interaction of the high energy neutrons with the formation is disposed in the instrument. A neutron shielding material surrounds the scintillator. A neutron moderator surrounds the neutron shielding material. An amplifier is optically coupled to the scintillator.

A method for neutron activation gamma ray well logging according to another aspect of the invention includes bombarding a subsurface formation with high energy neutrons. Neutrons emanating from the subsurface formation are moderated proximate a scintillator. The moderated neutrons are absorbed between the place of the moderating and the scintillator. At the scintillator gamma rays emanating from the subsurface formations resulting from interactions therewith of the neutrons are detected.

Other aspects and advantages of the invention will be apparent from the following description and the appended claims.

DETAILED DESCRIPTION

Figure 1:
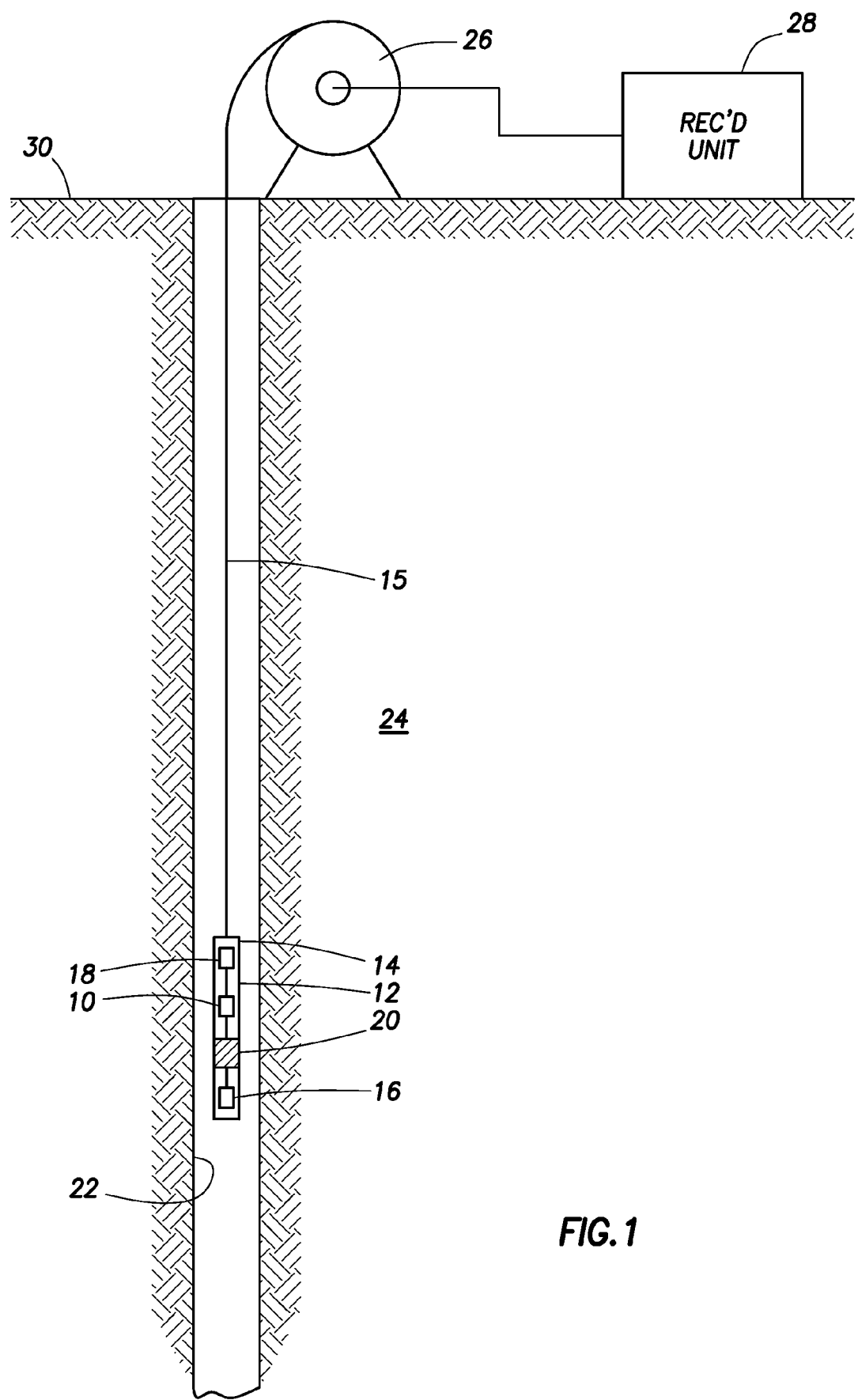
FIG. 1 shows an example nuclear radiation well logging instrument in a wellbore.

An example well logging instrument 12 is shown as it may be used in a wellbore in FIG. 1. The instrument 12 includes a generally elongated housing 14 configured to move along a wellbore 22 drilled through subsurface formations 24. The housing 14 may be made from stainless steel, titanium or similar material having wall thickness selected to resist crushing under hydrostatic pressure of fluid (not shown) in the wellbore 22. The instrument 12 may be moved along the wellbore 22 by an armored electrical cable 15. The cable 15 may be extended and retracted by a winch 26 or similar spooling device known in the art. Electrical power to operate the instrument 12 may be provided by a recording unit 28 disposed at the Earth's surface 30. The recording unit 28 may include equipment (not shown separately) for detecting, recording and interpreting signals transmitted from the instrument 12 as it moves along the wellbore 22. The example device for conveying the instrument 12 along the wellbore (cable 15 and winch 26) are only shown to provide an example of conveyance that may be used with an instrument according to the invention. Other devices known in the art, non-limiting examples of which include coiled tubing, drill pipe (including logging while drilling), production tubing and slickline may also be used to convey the instrument 12 along the wellbore 22. Accordingly, the conveyance shown in FIG. 1 is not intended to limit the scope of the present invention.

The instrument 12 may include a neutron source 16 within the housing 14. The source 16 in the present example may be a chemical isotope or accelerator (pulsed or DC) source of high energy neutrons. A shield 20 may be disposed inside the housing 14 between the source 16 and at least one radiation detector 10. The shield 20 may be made from a material having properties of substantially preventing direct movement of neutrons from the source 16 to the radiation detector 10. Thus, neutrons from the source 16 generally interact with fluid in the wellbore 22 and the surrounding formations 24, resulting in radiation events including gamma rays that may enter the at least one radiation detector 10 and be detected.

The radiation detector 10 in the present example may be configured to detect gamma rays emanating from the formations 24 in response to interaction between the neutrons from the source 16 and the various atomic nuclei in the formations 24. Energy level and/or numbers of such gamma rays may be related to properties of interest in the formations 24, including their chemical composition, fractional volume of pore space ("porosity") and the composition of fluids present in the pore spaces.

The gamma rays detected by the radiation detector 10 may result in electrical pulses produced by the detector 10 (explained with reference to FIG. 2) in response to such detections. Such electrical pulses may be communicated to a pulse height analyzer and telemetry unit, shown generally at 18 and disposed within the housing 14. The pulse height analyzer and telemetry unit 18 may impart signals to the cable 15 that correspond to the numbers of and energy levels of the detected gamma rays. Alternatively or additionally, the pulse height analyzer and telemetry unit 18 may include signal recording devices for storage of analyzed electrical pulses from the detector 10 for interrogation when the instrument 12 is withdrawn from the wellbore 22.

Figure 2:
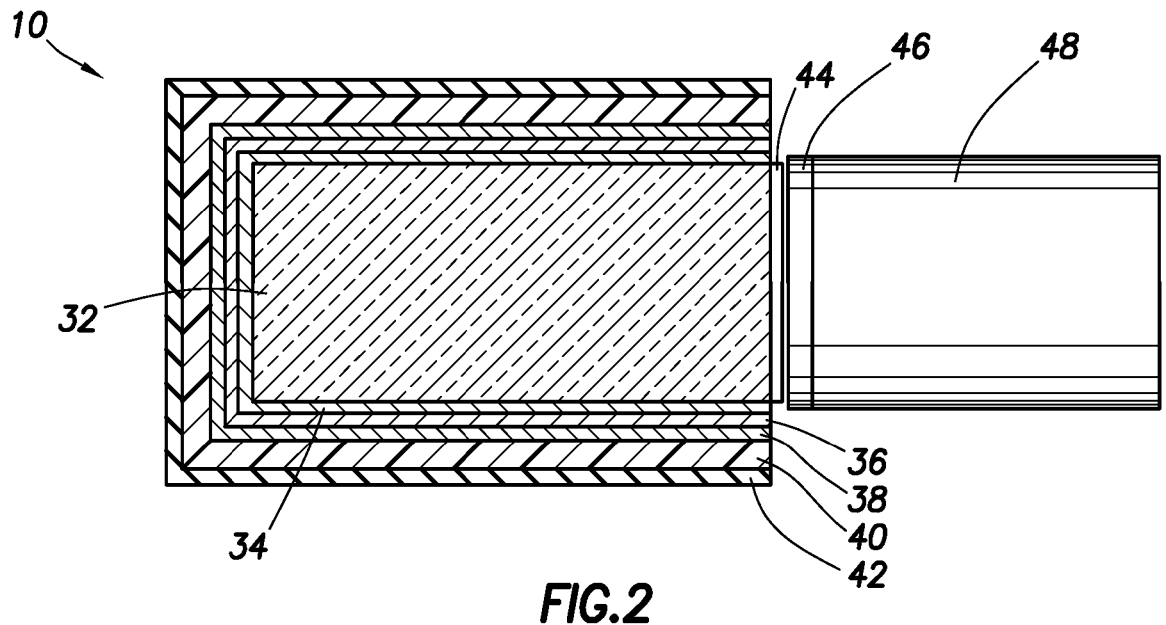
FIG. 2 shows an example radiation detector such as from the logging instrument of FIG. 1 in more detail.

An example of a radiation detector is shown in more detail in FIG. 2. The detector 10 may include a scintillation crystal 32 (or "scintillator"). The scintillation crystal 32 may be made from various materials known to emit flashes of light upon entry therein of gamma ray and/or x-ray radiation. Examples of such materials are described in U.S. Pat. No. 7,084,403 issued to Srivastava et al. The scintillation crystal 32 may be shaped generally as a cylinder and may be surrounded, other than on one longitudinal end, by an optically reflective material, shown as reflector 34. The reflector 34 serves to cause light traveling in a direction other than toward the one longitudinal end of the scintillation crystal 32 to be reflected back into the crystal 32, thus increasing the probability that such light will be directed toward a light detector, converter and amplifier 48, such as a photomultiplier tube, coupled to the longitudinal end of the scintillation crystal 32. Such amplifiers are known in the art. Suitable examples of amplifiers are set forth in U.S. Pat. No. 4,937,446 issued to McKeon et al. and assigned to the assignee of the present invention, or for example, in, G. Knoll, *Radiation Detection and Measurement*, J. Wiley (2000), ISBN-10: 0471073385, ISBN-13: 978-0471073383.

In the present example, the reflector 34 may be surrounded on its exterior by an x-ray shield 36. The x-ray shield 36 may be a thin foil made from a high atomic number (Z) material such as lead. The x-ray shield 36 can reduce the number of ionizing radiation photons below a threshold energy level from entering the scintillation crystal 32. By limiting entry of such low energy ionizing radiation photons, the number of detection signals generated that are unrelated to radiation events of interest may be substantially reduced. Notwithstanding the fact that the analyzer (18 in FIG. 1) could otherwise identify such photons by the amplitude of the corresponding electrical pulses from the amplifier 48, typically the amplifier 48 has a finite, non-zero recovery time after generating each electrical pulse in response to a scintillation from the crystal 32. Limiting detection pulses to those radiation events of interest by suitable shielding therefore may provide the benefit of increased overall detector efficiency.

Other nuclear reaction products, including alpha particles, electrons (beta particles) and neutrons could enter the detector 10 and cause nuclear reactions therein resulting in flashes of light not related to the radiation of interest to be detected by the instrument (22 in FIG. 1). Accordingly, radiation detectors according to the invention may include additional shielding devices to reduce the number of such reaction particles and other radiation from entering the detector (10 in FIG. 1). In the present example, a neutron shield 38 may be disposed over the exterior of the x-ray shield 36. The neutron shield 38 may be made from various materials that have a high neutron capture cross section, for example, boron (e.g., boron-10), lithium-6, cadmium and gadolinium, or compounds made therewith. Metallic lithium is highly chemically reactive, and so while having suitable neutron absorption properties, may be unsuitable for use as the neutron shield 38. An alternative may be, for example, lithium-6 carbonate. An advantage of using lithium-6 containing materials for the neutron shield 38 as contrasted, for example, with boron containing materials is that lithium does not discharge a gamma ray upon neutron capture; it only emits alpha particles (helium nuclei). Such emissions may be readily stopped from entering the crystal 32 by the x-ray shield 36 (if used), or by a thin metal foil, such as copper, silver or aluminum, for example. The neutron shield 38 may be made from solid material containing the neutron absorbing material, for example, solid metallic cadmium, or solid lithium carbonate. Alternatively, particles of the neutron absorbing material may be mixed in a binder such as epoxy resin or silicone rubber.

If a high Z material such as lead is used for the x-ray shield 36, then in some examples an additional foil layer, for example, an intermediate Z layer, may underlay the high Z material. For example, a lead outer foil may be underlain by a metallic silver inner foil. Such inner foil may absorb fluorescent x-rays that may be discharged by the lead foil by reason of, for example, absorption or scattering of higher energy radiation photons by the lead foil (characteristic x-rays). For purposes of the present example, "High Z" may be defined as Z being greater than 64. "Intermediate Z" may be defined as Z being between 35 and 66.

In some examples, the neutron shield 38 may be made from a dual layer material. For example a lithium-6 containing material may be used on the exterior of a dual layer neutron shield to absorb most entering thermal neutrons. An inner layer of boron-10 containing material may be used to absorb epithermal neutrons that otherwise pass through the lithium-6 containing material layer. The dual layer neutron shield may include solid layer materials or mixed materials as explained above with reference to the single layer neutron shield.

In some examples a neutron moderator 40 may surround the exterior of the neutron shield 38. The neutron moderator 40 may be made from materials having high concentration of hydrogen nuclei, for example, high density polypropylene or titanium hydride. The neutron moderator 40 serves the purpose of reducing energy of any entering neutrons so that they may be captured by the neutron shield 38 instead of entering the scintillation crystal 32. By excluding neutrons from the scintillation crystal 32, and consequent emission of light therefrom and/or neutron-induced creation of radioisotopes in the scintillation crystal 32 (which itself may lead to scintillation unrelated to the radiation phenomena of interest) accuracy of measurement of gamma photon spectra from neutron activation may be improved.

In the example shown in FIG. 2, a longitudinal end of the crystal 32 may be covered by an optical coupling 44 of types known in the art. The optical coupling 44 is typically placed in contact with a faceplate 46 of the photomultiplier or an equivalent device 48. The optical coupling material could also be loaded with a neutron absorbing material to improve the shielding, as long as the coupling material's optical transparency is substantially not affected.

In the example shown in FIG. 2, the reflector 34 may contain neutron absorbing materials. In this case the reflector acts simultaneously as a reflector of light from the scintillator 32 and as an absorber of neutrons.

Figure 3:
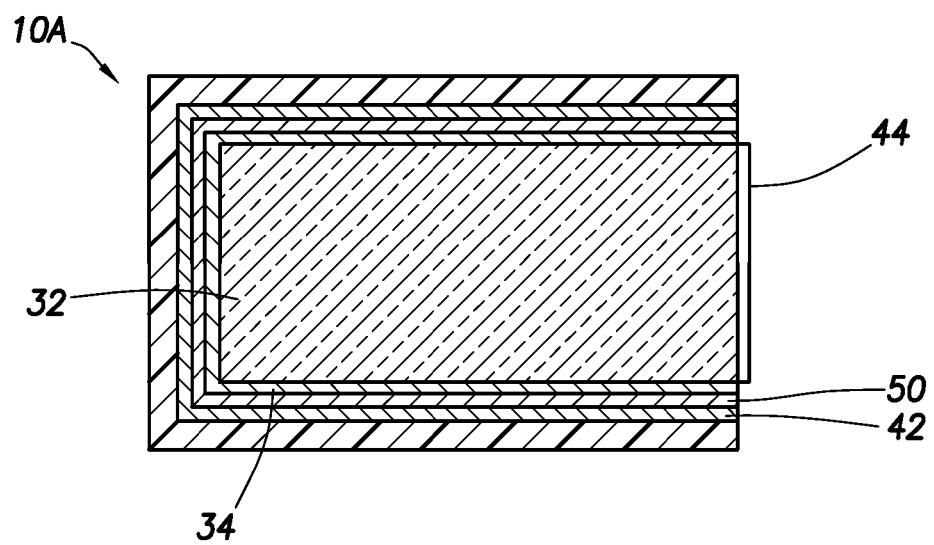
FIG. 3 shows another example radiation detector.

In another example of a shielded scintillation crystal 10A shown in FIG. 3, the reflector 34 may be surrounded by a metal foil 50, such as made from aluminum, to prevent entry of charged particles, including alpha particles and electrons, into the scintillation crystal 32.

Figure 4:
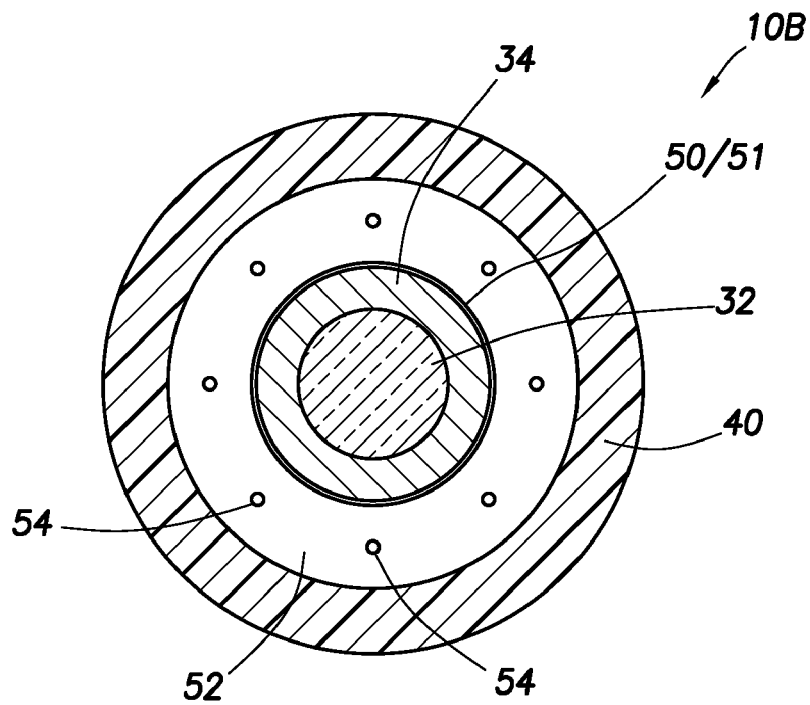
FIG. 4 shows an example of a combination neuron and gamma ray detector.

In another example, a radiation detector may provide neutron shielding for a scintillation crystal and the capability of detecting epithermal and/or thermal neutrons using the same devices. The shielded detector 10B in FIG. 4 includes a reflector 34 surrounding the scintillation crystal 32 as in the previous examples. The reflector 34 may include a charged particle shield 50 and/or x-ray shield around the reflector 34 as in other examples. A neutron moderator 40 may surround the exterior of the shielded detector 10B as in the previous examples. An annular space 52 between the moderator 40 and the reflector 34 (or charged particle or x-ray shield 50) may be filled with helium 3 gas. The annular space 52 may also include electrodes 54 such that the gas and electrodes in combination form a helium-3 thermal neutron detector. Thus, neutrons may be simultaneously detected and stopped from entering the crystal 32. As in the previous embodiments, the action of the gas in the annular space 52 may be supplemented by including a neutron absorbing layer (e.g., 38 in FIG. 2) such as may be made from lithium, boron, cadmium and/or gadolinium containing materials as explained above. In some examples, a combination of charged particle shield and/or x-ray shield may be disposed, as shown at 50 in FIG. 4, on the interior of the annular space 52. The shield 50 may be covered by an additional layer 51 of neutron absorbing material. In some examples, the neutron moderator 40 may be substituted by a thermal neutron absorbing material, such as cadmium or gadolinium, that is somewhat transparent to epithermal neutrons. In such examples, the helium-3 filled annulus with electrodes would serve to detect epithermal neutrons. Having a neutron absorbing layer such as may include lithium-6 inside the helium-3 filled annulus, as well as a charged particle/x-ray shield will in combination reduce entry of any nuclear reaction products from the helium-3 filled annulus into the scintillation crystal 32.

Figure 5:
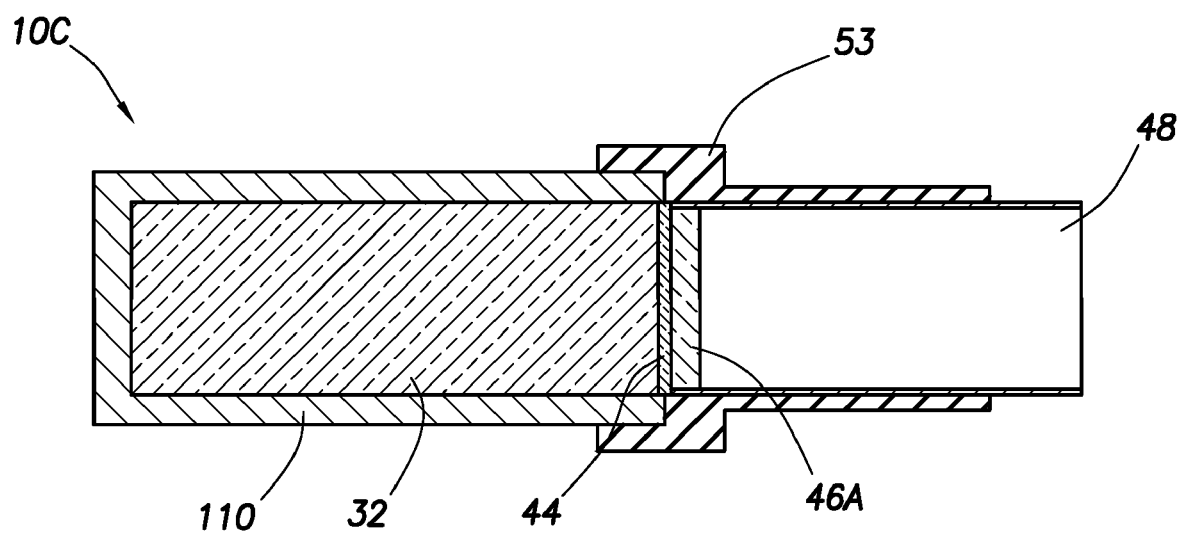
FIG. 5 shows an example of additional neutron shielding surrounding a photomultiplier in a radiation detector.

In any of the foregoing examples, the performance of the radiation detector may be improved by providing neutron shielding around part or all of the amplifier. Referring to FIG. 5, a radiation detector 10C may include a scintillator crystal 32 including external reflection and shielding materials 110 according to any of the previous examples. In the present example, part or all of the exterior of the amplifier 48 (e.g., photomultiplier) may be surrounded by a layer 53 made of neutron absorbing material. Such layer 53 may be applied during manufacture of the detector 10C and may be made from a potting compound such as room temperature vulcanizing ("RTV") silicone having mixed therein a neutron absorbing material as explained above with reference to the previous examples. In addition, or alternatively, the faceplate 46A of the amplifier 48 may be made from glass including neutron absorbing material therein. In making such a faceplate including neutron absorbing material, the material selected to absorb neutrons should be chosen to avoid causing scintillation within the faceplate 46A by reason of absorbing neutrons.

Figure 6:
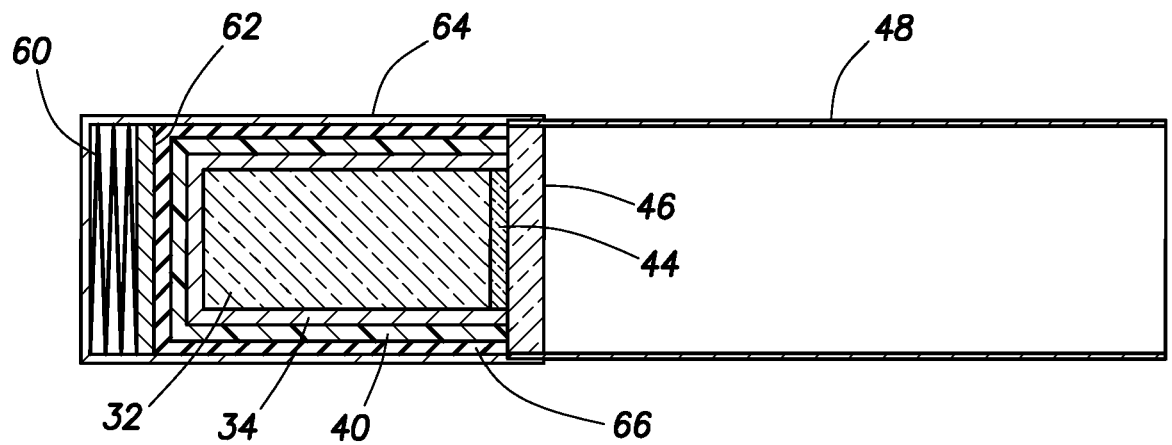
FIG. 6 and FIG. 7 show examples of a sealed, shock resistant mounting arrangement having neutron shielding.
Figure 7:
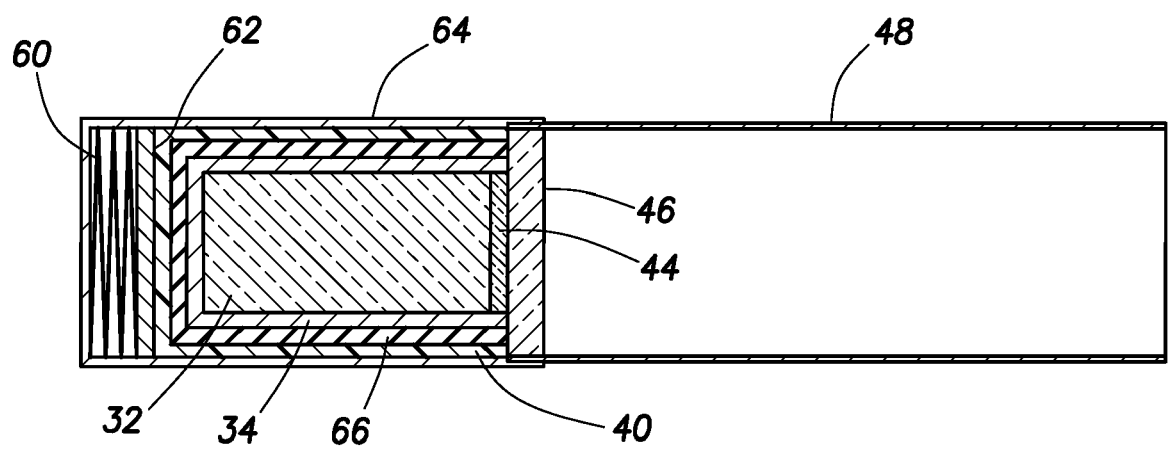

Any of the foregoing examples may be further improved by mounting the scintillation crystal 32 within a sealed, shock absorbing housing (e.g. 42 in FIGS. 2 and 3). Such housings are known in the art in particular where the crystal is made from hygroscopic material, and in the case of well logging instruments disposed in a drilling tool assembly ("logging while drilling" tools) for example, the crystal is mounted within the housing to isolate the crystal from excessive shock and vibration. See for example, U.S. Pat. No. 4,158,773 issued to Novak. Examples of such mounting according to the invention may be better understood by referring to FIGS. 6 and 7. In FIG. 6, the scintillation crystal 32 can be disposed within a reflector 34 as in the previous examples. The neutron shield 40 may be disposed externally to the reflector 34 as explained with reference to some examples above. A shock absorbing material 66 may include RTV silicone, cross-linked polymerizing gel agent dispersed in oil, or similar material that can cushion the crystal 32. Typically the foregoing components are mounted in a hermetically sealed housing 64. A longitudinal end of the crystal 32 opposite to the optical coupling 44 may be in contact with a pressure plate 62. The pressure plate 62 may be urged against the end of the crystal 32 by a spring 60 or similar biasing device. In some examples, the shock absorbing material 66 may itself include neutron absorbing material mixed therewith. The example shown in FIG. 6 includes the shock absorbing material 66 disposed externally to the neutron shield 40. The reverse arrangement is shown in FIG. 7.

Radiation detectors and well logging instruments made according to the various aspects of the invention may have improved performance with respect to detection of gamma rays resulting from neutron interactions in Earth formations by reason of reduced background noise from unwanted scintillations caused by neutron interactions in the scintillator crystal.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:
1. A well logging instrument, comprising:
a source of high energy neutrons arranged to bombard a formation surrounding the instrument;

at least one scintillator sensitive to gamma radiation resulting from interaction of neutrons with the formation;

a neutron shielding material surrounding the at least one scintillator, the neutron shielding material comprising helium-3 gas, at least one electrode disposed in the gas and configured to cause an electrical signal upon entry into the gas of a neutron;

a neutron moderator surrounding the neutron shielding material; and an amplifier optically coupled to the at least one scintillator.

2. The instrument of claim 1 further comprising an optical reflector disposed between the scintillator and the neutron shielding material.

3. The instrument of claim 2 where the optical reflector contains a neutron absorbing material.

4. The instrument of claim 2 further comprising an x-ray shield disposed between the neutron shielding material and the reflector.

5. The instrument of claim 4 wherein the x-ray shield comprises an outer layer of a high Z material and an inner layer of intermediate Z material.

6. The instrument of claim 1 wherein the neutron moderator comprises polyethylene.

7. The instrument of claim 1 wherein the neutron shielding material comprises at least one of lithium, boron, cadmium and gadolinium.

8. The instrument of claim 1 wherein the neutron shielding material comprises two adjacent layers each layer absorptive of neutrons having different energy than that of the other layer.

9. The instrument of claim 1 further comprising neutron shielding material disposed at least in part on an exterior of the amplifier.

10. The instrument of claim 1 wherein the scintillator is disposed in a hermetically sealed housing, and further comprising a shock absorbing material disposed between the scintillator and the housing.

11. The instrument of claim 10 wherein a neutron absorbing material is mixed with the shock absorbing material.

12. The instrument of claim 1 further comprising a radiation shield disposed between the source and the at least one scintillator, the radiation shield configured to substantially stop neutrons from traveling directly from the source to the at least one scintillator.

13. The well logging instrument of claim 1 further comprising a charged particle shield surrounding the scintillator and disposed between the scintillator and the neutron shielding material.

14. A method for neutron activation gamma ray well logging comprising:

bombarding a subsurface formation with high energy neutrons;

moderating neutrons emanating from the subsurface formation proximate a scintillator;

detecting at least one of epithermal neutrons and thermal neutrons during the act of absorbing the moderated neutrons by neutron reaction with helium-3 gas wherein said gas surrounds said scintillator;

absorbing the moderated neutrons between the place of the moderating and the scintillator; and detecting at the scintillator gamma rays emanating from the subsurface formations resulting from interactions therewith of the neutrons.

15. The method of claim 14 further comprising substantially preventing x-rays from entering the scintillator by passing radiation from the subsurface formations through an x-ray absorbing layer proximate the scintillator.

16. The method of claim 15 further comprising substantially preventing fluorescence x-rays generated by the x-ray absorbing layer from entering the scintillator by emplacing a fluorescence absorbing layer between the x-ray absorbing layer and the scintillator.

17. The method of claim 14 further comprising absorbing thermal neutrons prior to the detecting at least one of epithermal and thermal neutrons so as to detect substantially only epithermal neutrons.

18. The method of claim 14 wherein at least one of the moderating neutrons and the absorbing neutrons is performed using material having properties enabling substantially isolating the scintillator from shock and vibration.

19. The method of claim 14 further comprising shielding charged particles from entering the scintillator after detecting at least one of epithermal and thermal neutrons.

* * * * *